United States Patent [19]

Hara et al.

[11] Patent Number: 5,463,297
[45] Date of Patent: Oct. 31, 1995

[54] CIRCULAR TRACKING METHOD FOR ROBOT

[75] Inventors: Ryuichi Hara, Fujiyoshida; Atsuo Nagayama; Hidetoshi Kumiya, both of Yamanashi, all of Japan

[73] Assignee: Fanuc, Ltd., Minamitsuru

[21] Appl. No.: 354,027

[22] Filed: Dec. 6, 1994

[30] Foreign Application Priority Data

Dec. 10, 1993 [JP] Japan .................. 5-340934

[51] Int. Cl.$^6$ .................................................. G05B 19/00
[52] U.S. Cl. ...................... 318/568.13; 318/568.1; 318/573; 318/571; 364/474.31; 364/474.29
[58] Field of Search ....................... 318/560–646; 364/474.01–474.35; 901/2, 3, 5, 7, 9, 12, 13, 15–23; 395/80–99

[56] References Cited

U.S. PATENT DOCUMENTS

| | | | |
|---|---|---|---|
| 4,591,771 | 5/1986 | Nozawa et al. | 318/572 X |
| 4,811,235 | 3/1989 | Shirakata | 364/474.3 |
| 4,878,171 | 10/1989 | Kiya et al. | 318/573 X |
| 4,899,096 | 2/1990 | Kawamura et al. | 318/573 |
| 4,935,681 | 6/1990 | Kawamura et al. | 318/569 |
| 5,005,135 | 4/1991 | Morser et al. | 318/571 X |
| 5,065,333 | 11/1991 | Kawamura et al. | 318/573 X |
| 5,075,865 | 12/1991 | Kawamura et al. | 318/573 X |
| 5,134,570 | 7/1992 | Nankaku | 318/572 X |
| 5,193,952 | 3/1993 | Tomuo et al. | 318/574 X |
| 5,282,144 | 1/1994 | Kawamura et al. | 318/573 X |

FOREIGN PATENT DOCUMENTS 61-11808 1/1986 Japan.
61-56880 3/1986 Japan.

*Primary Examiner*—Paul Ip
*Attorney, Agent, or Firm*—Staas & Halsey

[57] ABSTRACT

A method of tracking a robot with respect to a circularly moving workpiece W. When a workpiece on a disc-shape conveyer remains stationary at a reference position W0, positions P0 and Q0 are taught to the robot in a stationary coordinate system Σ0 and the robot is placed on stand-by at a position A. The angular displacement of the disc-shape conveyer is detected by a pulse encoder and counting of the output pulses starts when the workpiece W arrives at the reference position W0. A CPU of a robot controller reads the counted amount in a short cycle and transforms it into a rotation amount θ of the conveyer from the reference position. Updating of matrix data for setting a rotary coordinate system Σrot based on the rotation amount θ is repeated. When the workpiece W reaches the reference position W0, the CPU executes interpolation calculation for successively determining a target point to which the robot is moved, based on the position data of the waiting position and the position data of teaching points P0 and Q0. The position data obtained by the interpolation calculation in the rotary coordinate system Σrot is converted into the position data in the stationary coordinate system Σ0 and the position of the robot is controlled based on thus obtained position data.

2 Claims, 4 Drawing Sheets

CIRCULAR TRACKING METHOD FOR ROBOT

BACKGROUND OF THE INVENTION

1. Field of the Invention:

This invention relates to a robot tracking method, and more particularly to a tracking method in robot operation on a workpiece moving in a circular trajectory.

2. Description of the Related Art:

In working on a stationary object (including various kinds of parts and a container-like mold for plastic products, hereinafter referred to workpiece) by an industrial robot, the robot is controlled according to the conventional teaching/ playback method or off-line teaching method in such a manner that the operation point of the robot traces a desired path. However, in the process line in a factory, for example, it is often desirable to use a conveyer for conveying the workpiece, while the robot is carrying out an operation on it, in view of the working efficiency. These operations of the robot is exemplified by painting, marking, pouring liquid and mechanical processes over the workpiece placed on the conveyer.

In such a case, if the robot position (the operation point of the robot) taught when the workpiece remains stationary is simply played back without any conversion, it is impossible to move the robot along a desired path. Consequently, the tracking cannot be performed until after the trajectory of the robot has been corrected in accordance with the movement of the workpiece.

Most of the conveyers to be used in process lines in factories are of the linear traveling type or the rotary disc type. In the case using the former type, the amount of movement of the conveyer is measured by the pulse encoder, and according to the measured amount of angular movement, a coordinate system used in teaching is shifted in parallel. On the basis of the shifted coordinate system, the operation of the robot is played back, maintaining the mutual positional relationship between the workpiece and the coordinate system.

SUMMARY OF THE INVENTION

It is an object of this invention to provide a robot tracking method in which a robot is moved along a desired trajectory as if the robot remains stationary even while a workpiece is circularly moving, placed on a disc-shape rotating conveyer.

According to a first aspect of the invention, there is provided a robot tracking method comprising the steps of: teaching the robot of position of said predetermined trajectory in a stationary coordinate system when the workpiece remains stationary at a reference position; detecting an amount of revolution of the workpiece from the reference position while the workpiece is circularly moving; setting a rotary coordinate system which is obtained by revolving the stationary coordinate system by the amount of revolution; successively calculating a robot position in the stationary coordinate system based on a robot position in the rotary coordinate system; and moving the robot along the predetermined trajectory based on the calculated robot positions.

According to a second aspect of the invention, there is provided a robot tracking method comprising the steps of: teaching the robot of position data of teaching points in the predetermined trajectory in a stationary coordinate system when the workpiece remains stationary at a reference position; detecting an amount of revolution of the workpiece from the reference position while the workpiece is circularly moving; obtaining position data of interpolation points based on the position data of the teaching points; successively executing revolution converting processing on the position data of interpolation points in accordance with the amount of the revolution, and successively determining the position of the robot based on the converted position data; and moving the robot along said predetermined trajectory based on the calculated positions of the robot.

DETAILED DESCRIPTION OF THE PREFERRED EMBODIMENT

First, the principles of this invention will be described with reference to FIG. 1.

A disc-shape conveyer 1 rotates in the direction of an arrow about an axis of rotation extending through the center O of the disc and perpendicularly thereto. A workpiece W is placed on the conveyer 1 and is revolved as a unit with the conveyer 1. A coordinate system $\Sigma 0$ (O-XYZ) is set in the robot as a stationary coordinate system to be used when the teaching operation is carried out. The origin of the coordinate system $\Sigma 0$ coincides with the disc center O, the X and Y axes cross each other at right angles on the disc, and the Z axis coincides with the axis of rotation of the conveyer 1.

Figure 1:
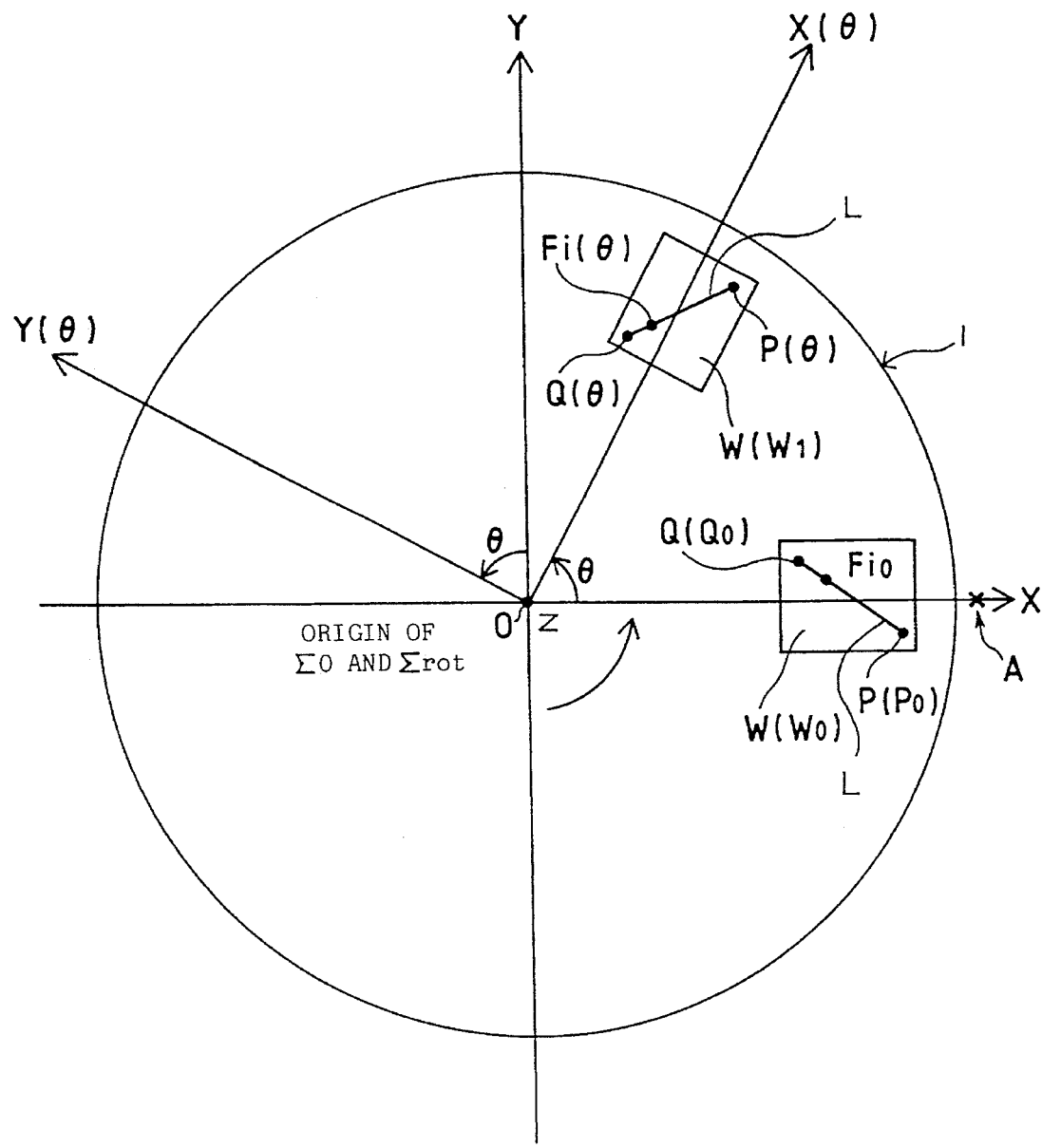
FIG. 1 is a schematic diagram illustrating the principles of a circular tracking according to the present invention.

In FIG. 1, a position W0 indicates a reference position of the workpiece W, and $\theta$ represents an angle of revolution of the workpiece W (identical with an angle of rotation of the conveyer 1) from the reference position W0.

When the workpiece W is placed stationary at the reference position W0, the robot is taught of the positions of teaching points defining a teaching line L in the coordinate system $\Sigma 0$. In this example, the teaching points are two points of a starting point P and a terminal point Q of the teaching line L. The operation point of the robot is moved from the point P to the point Q on the workpiece W while the conveyer 1 is rotated.

Teaching of the robot is performed by the teaching/ playback method or off-line teaching method. According to the teaching/playback method, the workpiece W is placed stationary at the reference position W0 and the robot is moved by a jog feed to locate the operation point of the robot at the point P0 and then at the point Q0. The position data at the point P0 and the point Q0 in the coordinate system $\Sigma 0$ are stored in a robot controller. According to the off-line teaching method, the position data of the points P0 and Q0 in the coordinate system $\Sigma 0$ are given directly to the robot controller.

If the program is played back when the conveyer 1 remains stationary at the reference position ($\theta = 0$), the moving path of the robot will be linear from the point P0 to the point Q0. The i-th interpolation point in the play back trajectory from the point P0 to the point Q0 is expressed by Fi0 where i=0, 1, 2, 3, ..., n; F00=P0, Fn0=Q0. Further, the coordinate value of the individual interpolation point Fi0 in the coordinate system $\Sigma 0i$ is expressed by (xi0, yi0, zi0).

For carrying out tracking while the conveyer 1 is rotated, it is necessary to convert the position of the interpolation point Fi0 in accordance with the revolved position of the workpiece W. The positions of workpiece W, the point P0 and the point Q0 when the conveyer 1 is rotated through an angle $\theta$ from the reference position are expressed as W1, P($\theta$) and Q($\theta$), respectively. Likewise, Fi($\theta$) represents the interpolation point Fi0 when the conveyer 1 is rotated through the angle $\theta$.

A position vector <OFi($\theta$)> is derived from the position vector <OFi0> by rotating it about the Z axis through the rotation angle $\theta$ of the workpiece W from the reference position. Accordingly, the coordinate value [xi($\theta$), yi($\theta$), zi($\theta$)] of the converted point Fi($\theta$) in the coordinate system $\Sigma 0$ is expressed by the following equations (1) through (3):

$$xi(\theta) = \cos\theta \cdot xi0 - \sin\theta \cdot yi0 \quad (1)$$

$$yi(\theta) = \sin\theta \cdot xi0 + \cos\theta \cdot yi0 \quad (2)$$

$$zi(\theta) = zi0 \quad (3)$$

It is understood from the foregoing description that circular tracking can be achieved by effecting a converting process corresponding to the calculations of the above equations (1)–(3) with respect to the position data representing the individual interpolation point Fi0, and successively controlling the robot position based on the converted position data. The rotational position $\theta$ of the workpiece W and the conveyer 1 from the reference position can be grasped at any time based on the output pulses from a conventional pulse encoder connected to a rotation shaft of the conveyer 1 or a shaft rotating with the rotation shaft.

The above converting process is mathematically equivalent to setting of a dynamic coordinate system $\Sigma rot(\theta)$ which rotates in synchronism with the conveyer 1 through the same angle (When $\theta=0$, $\Sigma rot(\theta)=\Sigma 0$). The dynamic coordinate system $\Sigma rot(\theta)$ as shown by O-X($\theta$)Y($\theta$)Z($\theta$) is a coordinate system associated with the robot during the playback operation of the robot. Therefore, for actual tracking, it can be adopted to rotationally shift the associated coordinate system during the playback operation of the robot by rewriting and updating matrix data for setting the coordinate system $\Sigma rot$ in accordance with the rotational angle $\theta$. Since the workpiece W rotates with the rotary coordinate system $\Sigma rot$, the position data of the points P and Q in the coordinate system $\Sigma rot$ is equivalent to the position data taught in the coordinate system $\Sigma 0$.

In order to convert the position data of the interpolation point Fi($\theta$) in the coordinate system $\Sigma rot$ into the position data in the coordinate system $\Sigma rot$, first, the coordinate data (xi0, yi0, zi0) of the interpolation point Fi0 is rewritten in the homogeneous coordinate equation to obtain a matrix [A0] expressed by the following equation (4):

$$[A0] = \begin{bmatrix} xi0 \\ yi0 \\ zi0 \\ 1 \end{bmatrix} \quad (4)$$

The matrix [A0] is multiplied from the left side by the following orthogonal matrix [B($\theta$)] to obtain a matrix [C($\theta$)].

$$[B(\theta)] = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \quad (5)$$

$$[C(\theta)] = [B(\theta)][A0] = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} xi0 \\ yi0 \\ zi0 \\ 1 \end{bmatrix} \quad (6)$$

$$= \begin{bmatrix} \cos\theta \cdot xi0 - \sin\theta \cdot yi0 \\ \sin\theta \cdot xi0 + \cos\theta \cdot yi0 \\ zi0 \\ 1 \end{bmatrix} \quad (7)$$

From the matrix equation (7), the coordinate data ($\cos\theta \cdot xi0 - \sin\theta \cdot yi0$, $\sin\theta \cdot xi0 + \cos\theta \cdot yi0$, zi0) in the coordinate system $\Sigma 0$ is obtained.

In an actual process line, it is often necessary to perform tracking with respect to individual workpieces which might be fed in irregular cycles onto the disc-shape conveyer. Even in such an event, the present invention is carried out without difficulty, for example, by detecting the arrival of the workpiece W by an appropriate detecting device and utilizing the detection signal as a signal for starting the operation of the robot which is positioned at an approach point (indicated by A in FIG. 1) in the vicinity of the reference position for every working cycle of the robot.

Figure 2:
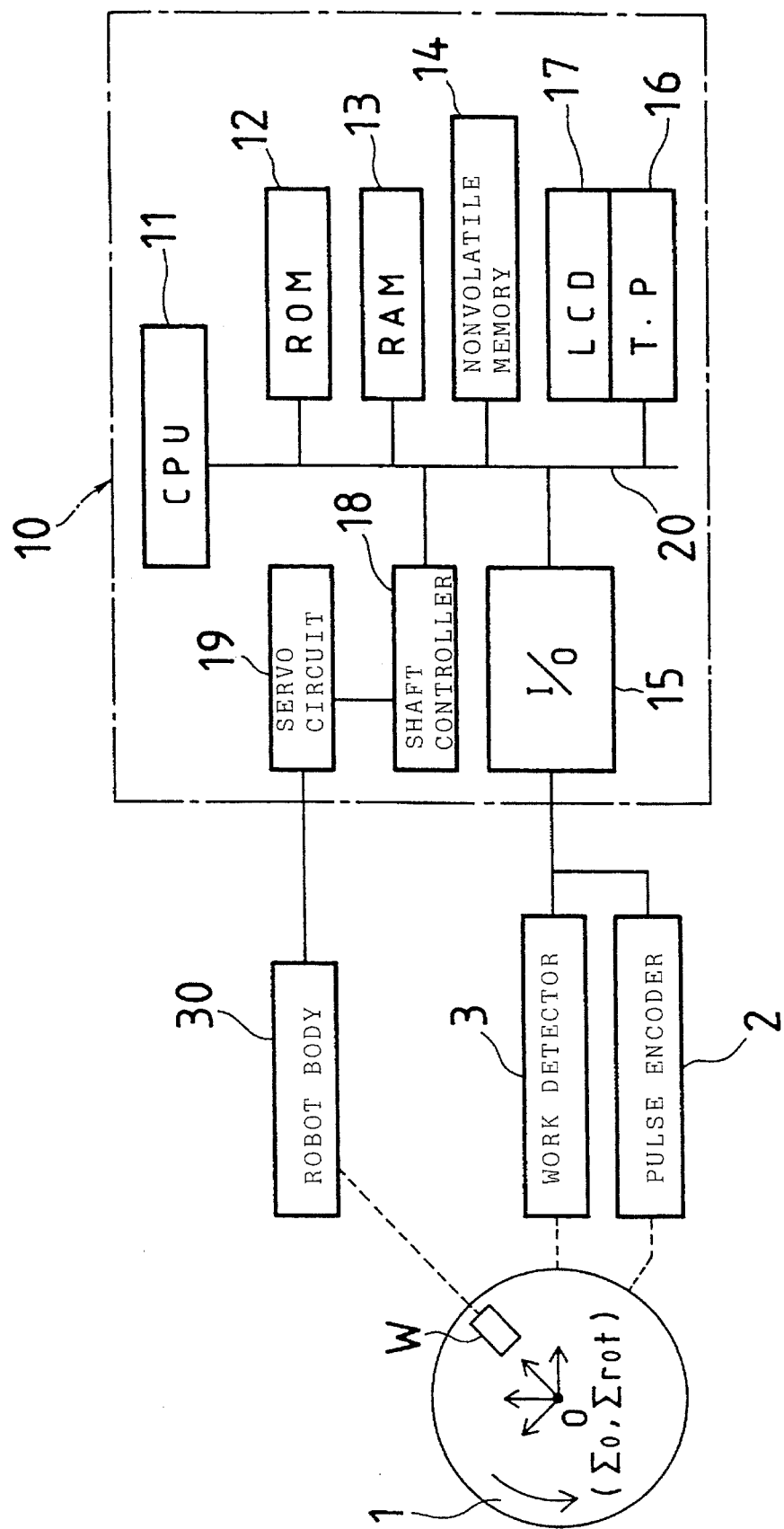
FIG. 2 is a fragmentary block diagram showing a robot system for carrying out a tracking method of the present invention.

FIG. 2 is a block diagram showing the general structure of a robot system for carrying out the method of the present invention.

The whole robot system comprises a disc-shape conveyer 1, a pulse encoder 2 for detecting the rotational position of the conveyer 1, a workpiece detector 3 for detecting the arrival of the workpiece W at the reference position and a robot controller 10. The robot controller 10 includes a central processing unit (CPU) 11. A memory 12 in the form of ROM, a memory 13 in the form of RAM, a nonvolatile memory 14, an input/output device 15, a teaching control panel 16 having a liquid crystal display (LCD) 17 and a robot shaft control section 18, which is connected with a robot body 30 via a servo circuit 19, are all connected with the CPU 11 through a bus 20.

A program for controlling the whole system including the robot controller 10 as a primary section is stored in the memory 12. The memory 13 is mainly used for temporarily storing data necessary for the calculation processing to be executed by the CPU 11. In the nonvolatile memory 14, teaching program data and the necessary set data for the individual sections of the system are stored.

To the input/output device 15, the pulse encoder 2 and the workpiece detector 3 are connected. While the system is in operation, pulses representing the amount of rotation of the conveyer 1 are outputted all the time, and when the workpiece W reaches the reference position W0, the workpiece detector 3 immediately outputs a reference position arrival signal. The workpiece detector 3 may be composed of a conventional detection means such as an optical detector (transmission-type and reflection-type) or a mechanical detector.

In the ROM 12, various kinds of programs are stored for the CPU 11 to control the whole system. The RAM 13 serves as a memory for temporary storage and calculation of data. Into the nonvolatile memory 14, various kinds of set data including teaching program data and coordinate system set data are inputted/stored from the teaching control panel 16 or a non-illustrated off-line program creating device.

Figure 3:
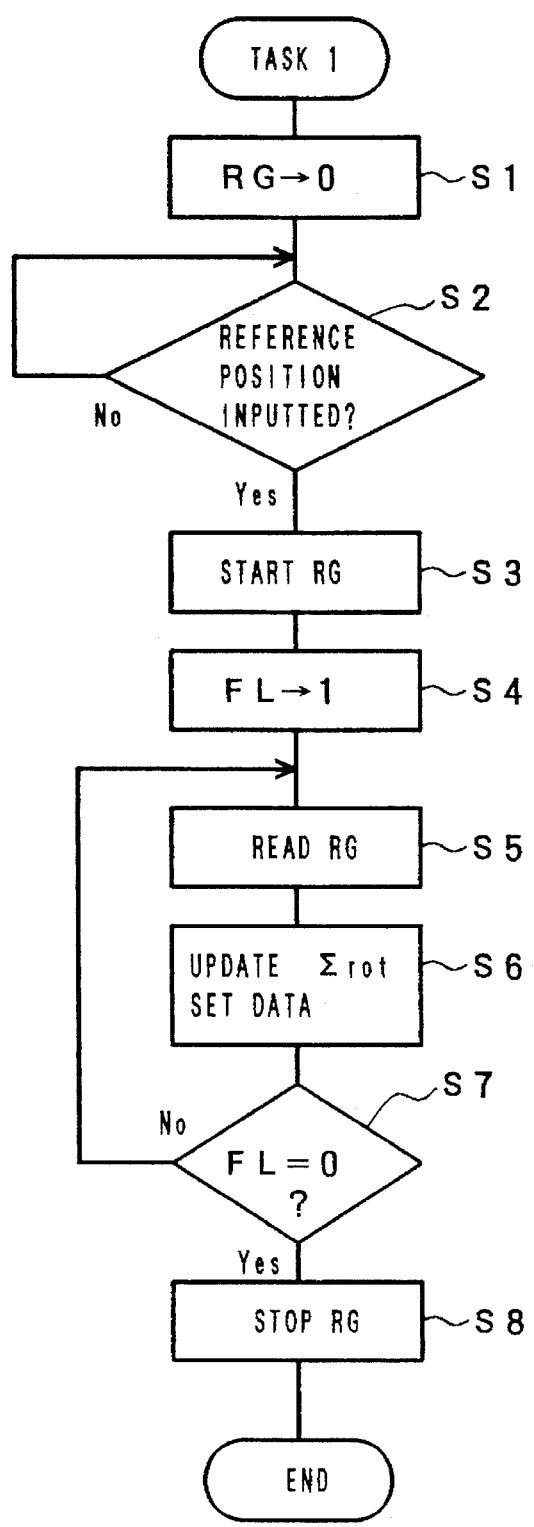
FIG. 3 is a flowchart illustrating the processings for counting output pulses of a pulse encoder and for rotating a coordinate system.
Figure 4:
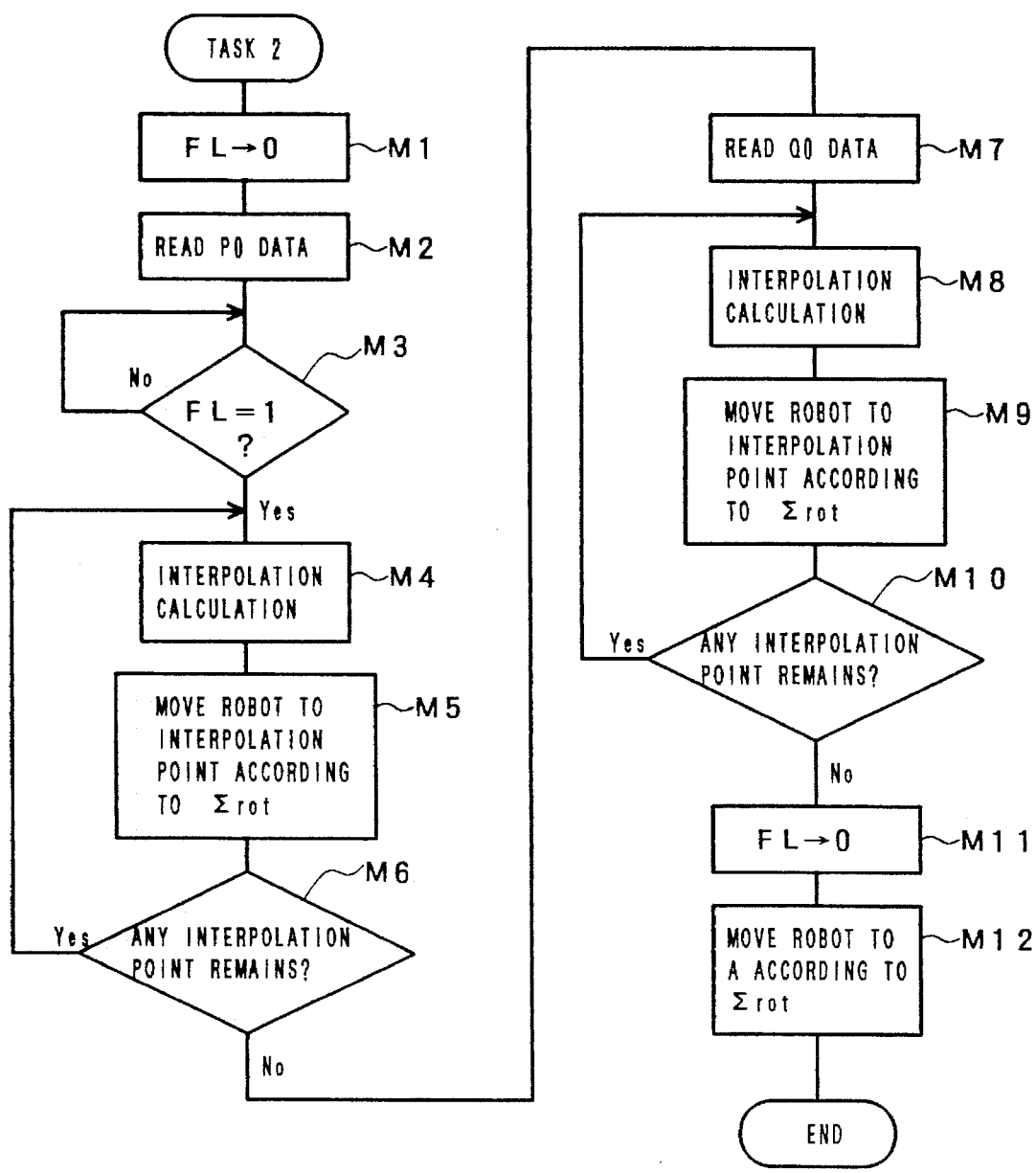
FIG. 4 is a flowchart illustrating the processings for carrying out tracking of a robot in cooperation with the processings of FIG. 3.

Further, in the robot system of this embodiment, in addition to the program for tracking a linearly moving workpiece, a program for the CPU 11 to execute the processings illustrated in the respective flowcharts of FIGS. 3 and 4 and necessary set data are stored in the nonvolatile memory 14. In the RAM 13, a register RG for counting output pulses of the pulse encoder 2 and a flag FL as an index of start/terminate of tracking processing are set.

The processing for moving the operation point of the robot along the trajectory PQ on the workpiece W with the point A (waiting position) in FIG. 1 as a starting point will now be described with reference to the flowcharts of FIGS. 3 and 4.

First, when the disc-shape conveyer 1 remains stationary, a workpiece W representing an actual object of operation is placed at a reference position (W0) on the conveyer 1, the robot body 30 is moved by the jog feed, and the positions P0 and Q0 are taught in the coordinate system $\Sigma 0$, whereupon the robot is rendered to wait at the waiting position A. Then, the operator selects the circularly-moving-workpiece-tracking mode, among the ordinary mode, the linearly-moving-workpiece-tracking mode and the circularly-moving-workpiece-tracking mode, to send the instruction using the teaching control panel 17.

The CPU 11 of the robot controller 10 starts the processings of FIGS. 3 and 4 in parallel upon receipt of a starting signal for feeding a workpiece W onto the disc-shape conveyer 1 from, e.g., a process line. FIG. 3 illustrates the processing (task 1) concerning the counting of output pulses of the pulse encoder 2 and the rotation of the associated coordinate system. FIG. 4 illustrates the processing (task 2) for circular tracking of the robot in cooperation of the task 1.

In the task 1, the CPU 11 initializes the register RG, which counts the output pulses of the pulse encoder 2, to zero (Step S1) and waits a detection signal, which indicates the arrival of the workpiece at the reference position W0, from the workpiece detector 3 (Step S2). When the workpiece W supplied onto the conveyer 1 from a non-illustrated supply device reaches the reference position W0, the detection signal is immediately inputted via the input/output device 15 to the CPU 11 so that the register RG starts counting the pulses (Step S3) and the flag FL are set to "1" (Step S4). Before setting the flag FL to "1" in Step S4, the flag FL is always "0" (Step M1 described below).

After the register has started counting, the counted value is read out until the flag FL is set to "0". The counted value is transformed into the angular displacement $\theta$ of the conveyer 1 (workpiece W) from the reference position, and updating of the matrix data for converting the coordinate system $\Sigma \text{rot}$ to the coordinate system $\Sigma 0$ is repeated (Steps S5–S7). Specifically, the processing of updating the value of $\theta$ (initial value is 0) of the equation (5) is repeatedly executed to thereby complete the preparation to obtain the robot position in the stationary coordinate system $\Sigma 0$ from the robot position in the rotary coordinate system $\Sigma \text{rot}$.

When the robot reaches the point Q on the workpiece W and further tracking becomes unnecessary, the flag FL is inverted to "0" (Step M11 of the task 2, described below) and the counting of the register is stopped (Step S8), terminating the processings for one operation cycle.

In the task 2, first, the flag FL is set to "0" (Step M1) and the position data of the point P0 is read (Step M2). Then the CPU 11 waits for the flag FL to reverse to "1" (Step M3). When the workpiece W reaches the reference position the flag FL immediately reverses to 1 (Step S4 of the task 1) and the CPU 11 starts, based on the current position data of the waiting position A and the position data of the point P0, interpolation calculation for successively determining a target point for moving the robot (Step M4). Then, the operation point of the robot is moved to the position of the target point determined based on the interpolation calculation (Step M5).

At that time, since the processing cycle of Steps S4–S6 of the task 1 has already started to run and hence the rotary coordinate system $\Sigma \text{rot}$ has begun to rotate in synchronism with the rotation of the conveyer 1, the calculated target position is $Fi(\theta)$ (FIG. 1) derived by revolving the position of the interpolation point $Fi0$, which is calculated in the coordinate system $\Sigma 0$ for teaching, through an angle $\theta$. Namely, the calculation according to equation (6) is executed based on the matrix data updated in Step S6 of the task 1, the position data of the position of the interpolation point $Fi0$ in the rotary coordinate system $\Sigma \text{rot}$ is converted into the position data in the stationary coordinate system $\Sigma 0$.

The robot having started tracking movement from the waiting position A continues the movement until there is no remaining interpolation point between the point A and the point P0 (Steps M4–M6). Subsequently, the procedure proceeds to the Step M7 immediately before the operation point of the robot reaches the point P on the workpiece W which is in revolution and the teaching data of the point Q0 is read out. Since then, the processing cycle (Steps M8–M10) similar to the tracking movement from the point A to the point P on the moving workpiece W is executed so that the robot performs a linear movement on the workpiece (a curved path as viewed from the coordinate system $\Sigma 0$) from the point P to the point Q. If the type of movement designated by the operation program is circular, an circular path is realized on the moving workpiece W.

When the robot reaches the point Q on the moving workpiece W and tracking has become unnecessary, the flag FL is set to "0" (Step M11). As a result, the register stops counting the pulses (Step S7 of the task 1) and the rotation of the coordinate system $\Sigma \text{rot}$ also stops. Then, the robot is moved to the position designated by the position data of the waiting point A in the coordinate system $\Sigma \text{rot}$, and is separated from the workpiece W on the rotating conveyer 1 (Step M12), thus terminating the processings of one operation cycle.

In order to return the robot to the waiting point A (in the coordinate system $\Sigma 0$) to get ready for the next operation cycle, it is only required to execute the processing of moving the robot to the waiting point via an appropriate air-cut point in the coordinate system $\Sigma 0$ after clearing the register RG and the coordinate set data ($\theta = 0$).

In the foregoing embodiment, tracking is achieved by creating a rotary coordinate system associated with the revolving workpiece W when the robot is moved. Alternatively, the same tracking is performed using only the stationary coordinate system $\Sigma 0$, by executing calculation according to the equations (1)–(3) in the interpolation calculation.

According to the present invention, with respect to various objects of operation which are moving as carried on a disc-shape conveyer widely used in the process line of a factory, the robot's operation is carried out in a similar manner when the workpiece remains stationary. when the circular tracking method of this invention is employed in combination with the conventional linear tracking method, it is possible to carry out the operation of the robot without interrupting the movement of the workpiece on the conveyer generally employed in the process line in a factory, thus achieving an improved efficiency of production.

What is claimed is:

1. A robot tracking method for moving a robot along a trajectory predetermined on a circularly moving workpiece, comprising the steps of:
   (a) teaching the robot of position of said predetermined trajectory in a stationary coordinate system when the workpiece remains stationary at a reference position;
   (b) detecting an amount of revolution of the workpiece from said reference position while the workpiece is circularly moving;
   (c) setting a rotary coordinate system which is obtained by revolving said stationary coordinate system by said amount of revolution detected in said step (b);
   (d) successively calculating a robot position in said stationary coordinate system based on a robot position in said rotary coordinate system; and
   (e) moving the robot along said predetermined trajectory based on the robot positions calculated in said step (d).

2. A robot tracking method for moving a robot along a trajectory predetermined on a circularly moving workpiece, comprising the steps of:
   (a) teaching the robot of position data of teaching points in said predetermined trajectory in a stationary coordinate system when the workpiece remains stationary at a reference position;
   (b) detecting an amount of revolution of the workpiece from said reference position while the workpiece is circularly moving;
   (c) obtaining position data of interpolation points based on said position data of said teaching points;
   (d) successively executing revolution converting processing on said position data of interpolation points in accordance with said amount of revolution detected in said step (b), and successively determining the position of the robot based on the converted position data; and
   (e) moving the robot along said predetermined trajectory based on the positions of the robot calculated in said step (d).

* * * * *